Patented Mar. 14, 1933

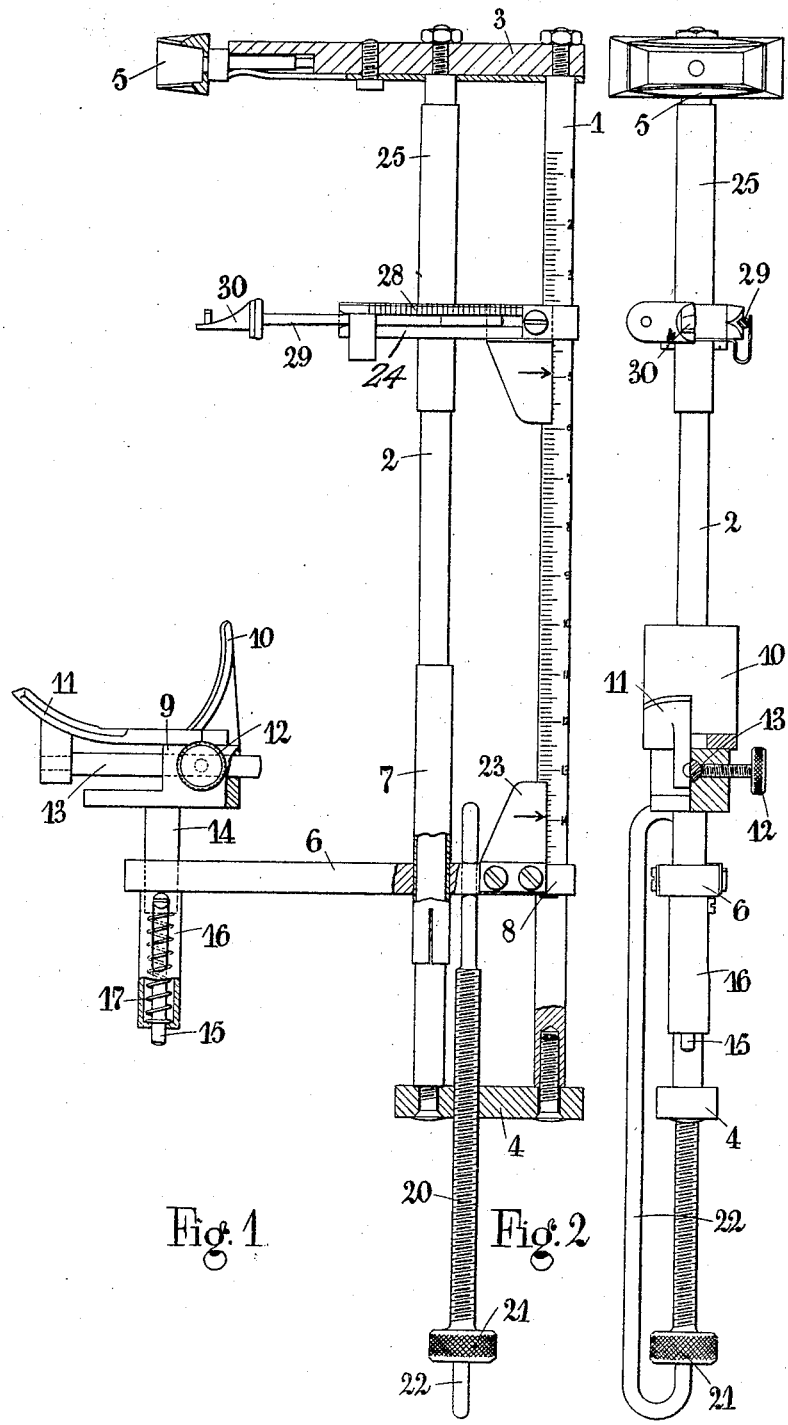

1,901,724

UNITED STATES PATENT OFFICE

NORMAN GODFREY BENNETT, OF LONDON, ENGLAND

MEASURING APPLIANCE

Application filed June 13, 1929, Serial No. 370,687, and in Great Britain July 28, 1928.

This invention relates to a form of measuring appliance for use in measuring certain facial dimensions and is of particular use in prosthetic dentistry for ascertaining what is known as the height of the bite. The object of the invention is the provision of means for measuring accurately the distances between the root of the nose, the teeth and the chin.

The invention consists in apparatus including a framework, suitably graduated, a fixed and a sliding member mounted on and projecting from said framework, means for adjusting and measuring the displacement of the sliding member relative to the fixed member, means on the fixed member for locating its projecting end on a person's nasion and means on the sliding member for locating its projecting end on the said person's chin.

The invention further consists in apparatus substantially as hereinafter described.

Fig. 1 shows a side view of the preferred embodiment of my invention, and

Fig. 2 shows a front view of the device shown in Fig. 1.

Two parallel vertical rods 1, 2 are connected rigidly together by means of two horizontal rods 3, 4, one at the top and one at the bottom of the vertical rods. The upper horizontal rod 3 projects in one direction to carry one of the attachments concerned in making the measurements. The upper horizontal rod 3 is provided with a detachable frictionally held end-piece 5 to carry a small portion of modelling composition which is adapted when warm and soft to the nasion or depression at the root of the nose and becomes hard when chilled. A third horizontal rod 6 intermediate between the other two is made to travel up and down the two vertical rods by means of tubular attachments 7 and 8. This third rod 6 carries at its free end an attachment 9 for making contact with the chin. Rigid with 9 is a vertical plate 10 which rests in front of the chin and is slightly convex in horizontal section and concave in vertical section. An oblique plate 11 which impinges on the under or side of the chin, also convex towards the chin, is connected to the part 10 by a sliding union having a graduated scale, not shown, for adaptation to different thicknesses of chin. When adjusted, the part 11 may be clamped to the part 10 by means of a milled-headed screw 12 bearing upon a slide rod 13. A vertical stalk 14 below this chin contact carries a plunger 15 which slides in a vertical tube 16 rigidly connected with the horizontal rod and presses upon a compression spring 17. An index mark on the plunger 15 and a graduated scale on the tube 16 may be used to show to what extent the spring is compressed. This mark and scale have been omitted from the drawing for clearness. The whole movable horizontal rod 6 carrying the chin-piece 9 is actuated by means of a long screw 20 which passes through the lower horizontal rod 4, and which is provided with a milled head 21 below, and bears upon the lower surface of the movable horizontal rod 6 above. A stiff C-shaped spring 22 presses the upper surface of the movable horizontal rod towards the lower surface of the milled head and keeps the horizontal rod always in contact with the milled-head screw 20. The compression spring 17 on which the plunger of the chin contact descends permits one to obtain an equal degree of compression of the soft parts of the chin each time a reading is taken on the same individual and thereby eliminates error on that account. Contact with the chin is made at two facets only by the two plates 10 and 11 forming the adjustable chin-piece. This ensures automatic adaptation to the same two facets when pressure is brought to bear by means of the long screw 20. The vertical rod 1 remote from the facial attachments is suitably graduated, for instance with a millimeter scale, and an indicator 23 is attached to the movable horizontal rod 6 which slides along the vertical rod and gives readings to represent the distance between the nasion or root of the nose and the chin. These measurements afford only an approximate comparison between different persons but are constant when repeated on the same individual.

An additional attachment may be used which consists of a horizontal rod 24 above the horizontal rod 6 carrying the chin contact 9. This additional horizontal rod slides on the vertical rod 2 by means of a tubular attachment 25 and is also capable of motion round the vertical rod 2 in a horizontal plane. A spring attachment not shown connects it to the vertical rod 1, and an index on the additional rod 24 shows on the millimeter scale on the rod 1 the distance from the upper end of the vertical rod 1. The rod 24 is prolonged towards the face and is furnished with a graduated scale 28. A flattened extension 29 with a small terminal L-piece 30 adapted to make contact with the edges of the upper central incisors, slides in a groove in the rod 24 and carries an index mark which coacts with the scale 28. Its use is to determine and indicate the position of the edges of these teeth in both horizontal and vertical direction in respect to the nasion and the nasion chin line.

Having now described my invention, what I claim as new and desire to secure by Letters Patent is:—

1. A device for facial measurement comprising an oblong framework, a member fixed to and extending laterally of said framework, a plastic material receiving cup swivelly mounted on the free end of said fixed member, a member mounted near the other end of the framework and longitudinally slidable thereon, means for measuring the displacement of the slidable member relative to the cup, and a chin engaging member yieldingly mounted on the projecting end of the slidable member.

2. A device as claimed in claim 1, wherein the chin engaging member is composed of two relatively movable parts for respectively engaging the front and underside surfaces of the chin, and means for clamping said parts in the desired position of adjustment relative to each other.

3. A device as claimed in claim 1 including an additional member projecting substantially at right angles from and slidable longitudinally upon said framework and adjustable relatively to the said fixed member, the said additional member carrying at its projecting end an attachment slidable on the said additional member and laterally of the said framework, and a coacting index and scale associated with said attachment and said additional member.

4. A device as claimed in claim 1, wherein the framework includes two elongated bars and cross bars connecting the corresponding ends of the bars together so that the elongated bars are arranged in spaced parallel relation with each other and wherein the means for adjusting the slidable member includes an elongated screw engaged through one cross bar and contacting with one surface of the slidable member, and a C-shaped spring engaging the opposite surface of the said slidable member and the head of the screw.

5. A device for facial measurement including a framework, a fixed and a sliding member mounted upon and projecting from said framework, the axes of said fixed and said sliding members being in one plane, means for displacing the sliding member relatively to the fixed member and means for measuring any such displacement, a receptacle at the end of said fixed member adapted to be filled with a modelling composition, and a chin contacting member, resiliently mounted near the projecting end of said sliding member, and comprising a part for contacting with the front of the chin and a relatively adjustable part for contacting with the underside of the chin.

In testimony whereof I have signed my name to this specification.

NORMAN GODFREY BENNETT.